(12) United States Patent
Nakamura et al.

(10) Patent No.: US 8,776,377 B2
(45) Date of Patent: Jul. 15, 2014

(54) METHOD FOR MANUFACTURING A FLUID DYNAMIC BEARING, A FLUID DYNAMIC BEARING, A MOTOR, AND A DISK DRIVE DEVICE

(75) Inventors: Shoei Nakamura, Shizuoka (JP); Hirofumi Kajiwara, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 636 days.

(21) Appl. No.: 12/559,424

(22) Filed: Sep. 14, 2009

(65) Prior Publication Data
US 2010/0192378 A1 Aug. 5, 2010

(30) Foreign Application Priority Data

Feb. 4, 2009 (JP) .................................. 2009-023665

(51) Int. Cl.
*B21D 53/10* (2006.01)
(52) U.S. Cl.
USPC ........................................ 29/898.02; 384/107
(58) Field of Classification Search
USPC ............ 29/898.02, 898.04, 898.041; 384/105, 384/107, 119; 141/59
See application file for complete search history.

(56) References Cited

U.S. PATENT DOCUMENTS

| | | | | |
|---|---|---|---|---|
| 5,314,216 A | * | 5/1994 | Umezawa | 285/319 |
| 5,601,125 A | * | 2/1997 | Parsoneault et al. | 141/51 |
| 5,778,948 A | * | 7/1998 | Gomyo et al. | 141/7 |
| 5,862,841 A | * | 1/1999 | Wuester, Sr. | 141/284 |
| 6,436,021 B2 | * | 8/2002 | Nukui | 483/1 |
| 6,733,180 B2 | * | 5/2004 | Nakamura | 384/100 |
| 7,028,721 B2 | * | 4/2006 | Bowdoin et al. | 141/59 |
| 7,040,019 B2 | * | 5/2006 | Kaimi et al. | 29/898.02 |
| 7,043,839 B2 | * | 5/2006 | Hayashi et al. | 29/898.02 |
| 7,048,444 B2 | * | 5/2006 | Kurimura et al. | 384/119 |
| 7,168,463 B2 | * | 1/2007 | Misu et al. | 141/67 |
| 7,328,511 B2 | * | 2/2008 | Misu et al. | 29/898.02 |
| 7,344,002 B2 | * | 3/2008 | Neumann et al. | 184/5.1 |
| 7,694,699 B2 | * | 4/2010 | Lim et al. | 141/59 |
| 2002/0175577 A1 | * | 11/2002 | Yoshitsugu et al. | 310/90 |

(Continued)

FOREIGN PATENT DOCUMENTS

JP H0512997 A 1/1993
JP 11289710 A 10/1999

(Continued)

OTHER PUBLICATIONS

JPO, Office Action with Translation from Japanese Patent Application No. 2009-023665 dated Dec. 20, 2011.

(Continued)

*Primary Examiner* — David Bryant
*Assistant Examiner* — Jacob Cigna
(74) *Attorney, Agent, or Firm* — Blank Rome LLP (57) ABSTRACT

In the method for manufacturing a fluid dynamic bearing, the fluid dynamic bearing that lubricant is not injected into is prepared in a predetermined work space. The pressure in the work space is reduced. A delivery nozzle that delivers the lubricant is inserted into the storage region. The lubricant is delivered in the storage region so that the lubricant does not spill over from the storage region. The pressure in the work space is restored. Another way is that a lubricant is ejected after an oil repellent region for preventing the lubricant from leaking out is covered.

20 Claims, 6 Drawing Sheets

(56) References Cited

U.S. PATENT DOCUMENTS

| | | | |
|---|---|---|---|
| 2004/0107577 A1* | 6/2004 | Hayashi et al. | 29/898.02 |
| 2004/0256178 A1* | 12/2004 | Neumann et al. | 184/7.4 |
| 2004/0264819 A1* | 12/2004 | Weingord et al. | 384/107 |
| 2005/0000092 A1* | 1/2005 | Misu et al. | 29/898.02 |
| 2005/0111769 A1* | 5/2005 | Haga | 384/119 |
| 2005/0183906 A1* | 8/2005 | Misu et al. | 184/7.4 |
| 2005/0186101 A1* | 8/2005 | Misu et al. | 418/55.5 |
| 2006/0132968 A1* | 6/2006 | Kobayashi et al. | 360/99.08 |
| 2006/0291757 A1* | 12/2006 | LeBlanc et al. | 384/107 |
| 2007/0147715 A1* | 6/2007 | Kainoh et al. | 384/100 |
| 2007/0227616 A1* | 10/2007 | Lim et al. | 141/59 |
| 2008/0137229 A1* | 6/2008 | Nakamura et al. | 360/99.08 |
| 2009/0001844 A1* | 1/2009 | Kodama et al. | 310/265 |
| 2009/0152969 A1* | 6/2009 | Narita et al. | 310/90 |
| 2010/0226601 A1* | 9/2010 | Inazuka et al. | 384/107 |
| 2010/0254639 A1* | 10/2010 | Yamazaki | 384/100 |

FOREIGN PATENT DOCUMENTS

| | | |
|---|---|---|
| JP | 2000320542 A | 11/2000 |
| JP | 2001200399 A | 7/2001 |
| JP | 2002005170 | 1/2002 |
| JP | 2002005170 A | 1/2002 |
| JP | 2003130053 A | 5/2003 |
| JP | 2003314553 A | 11/2003 |
| JP | 2004003622 A | 1/2004 |
| JP | 2004092814 A | 3/2004 |
| JP | 2004098180 A | 4/2004 |
| JP | 2005012997 A | 1/2005 |
| JP | 2005076858 A | 3/2005 |
| JP | 2005098393 | 4/2005 |
| JP | 2005098393 A | 4/2005 |
| JP | 2005180622 A | 7/2005 |
| JP | 2005273908 | 10/2005 |
| JP | 2005273908 A | 10/2005 |
| JP | 2007327528 A * | 12/2007 |

OTHER PUBLICATIONS

JPO, Office Action (with English Translation) issued in Japanese Application No. 2009-023665 dated Oct. 25, 2011.
Notification of Reason for Refusal, Jan. 31, 2013, 8 pages.

* cited by examiner

METHOD FOR MANUFACTURING A FLUID DYNAMIC BEARING, A FLUID DYNAMIC BEARING, A MOTOR, AND A DISK DRIVE DEVICE

CROSS-REFERENCE TO RELATED APPLICATION

This application is based upon and claims the benefit of priority from the prior Japanese Patent Application No. 2009-023665, filed on Feb. 4, 2009, the entire contents of which are incorporated herein by reference.

BACKGROUND OF THE INVENTION

1. Field of the Invention

The present invention relates to a method for manufacturing a fluid dynamic bearing, a fluid dynamic bearing manufactured by the method, a motor that comprises the fluid dynamic bearing, and a disk drive device that comprises the motor. In particular, the present invention relates to technique to fill lubricant in a fluid dynamic bearing.

2. Description of the Related Art

A magnetic-disk drive device such as a hard disk drive and an optical-disk drive device such as a CD (Compact Disc) device and a DVD (Digital Versatile Disc) device are known as devices for recording and reading digital data. These devices comprise a motor for rotating a disk. Lately, the fluid dynamic bearing has been adopted in these motors in many situations.

Various methods for manufacturing the fluid dynamic bearing are proposed, such as a method disclosed in Japanese Patent Application Publication No. 2002-5170, a method disclosed in Japanese Patent Application No. 2005-98393, and a method disclosed in Japanese Patent Application Publication No. 2005-273908.

SUMMARY OF THE INVENTION

The inventors of the present invention encountered the following concern regarding the method for manufacturing the fluid dynamic bearing: the fluid dynamic bearing comprises a storage region for storing the lubricant. An oil repellent region is located around the entrance of the storage region. The oil repellent region repels the lubricant and is arranged to prevent the lubricant from leaking out. According to the prior art method for manufacturing the fluid dynamic bearing, the lubricant may adhere to the oil repellent region at the step of injecting the lubricant in the storage region. It is possible for the adhered lubricant to deteriorate the function of the oil repellent region.

The present invention addresses these disadvantages, and a general purpose thereof is to provide a method for manufacturing a fluid dynamic bearing that reduces contamination caused by the lubricant.

An embodiment of the present invention relates to a method for manufacturing a fluid dynamic bearing. This method includes: preparing the fluid dynamic bearing that lubricant is not injected into in a predetermined work space; reducing the pressure in the work space; inserting a nozzle that delivers the lubricant into a storage region of the fluid dynamic bearing arranged to store the lubricant; delivering the lubricant in the storage region so that the lubricant does not spill over from the storage region; and restoring the pressure in the work space.

Another embodiment of the present invention is also a method for manufacturing a fluid dynamic bearing. This method includes: preparing the fluid dynamic bearing that lubricant is not injected into in a predetermined work space; covering an oil repellent region located around the entrance of a storage region of the fluid dynamic bearing arranged to store the lubricant, the oil repellent region arranged to prevent the lubricant from leaking out; reducing the pressure in the work space; aiming at least two nozzles that are located apart from the storage region so that ejected droplets of the lubricant enter the entrance of the storage region; ejecting the droplets of the lubricant from the at least two nozzles so that the lubricant does not spill over from the storage region; and restoring the pressure in the work space.

Optional combinations of the aforementioned constituting elements, and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

The size of the component in each figure may be changed in order to aid understanding. Some of the components in each figure may be omitted if they are not important for the explanation.

The first and the second embodiments of the present invention relate to a method for manufacturing a fluid dynamic bearing, in particular to a method for injecting lubricant, such as oil, in a predetermined storage region of the fluid dynamic bearing. In the method according to the first embodiment of the present invention, the lubricant is injected after a nozzle with a flat tip intrudes inside the storage region. This may prevent the lubricant from adhering around the entrance of the storage region. In particular, this may prevent the lubricant from adhering to an oil repellent region located around the entrance of the storage region and arranged to prevent the lubricant from leaking out, thereby strengthening the prevention of leakage.

In the method according to the second embodiment of the present invention, lubricant is injected after an oil repellent region is covered.

Figure 1:
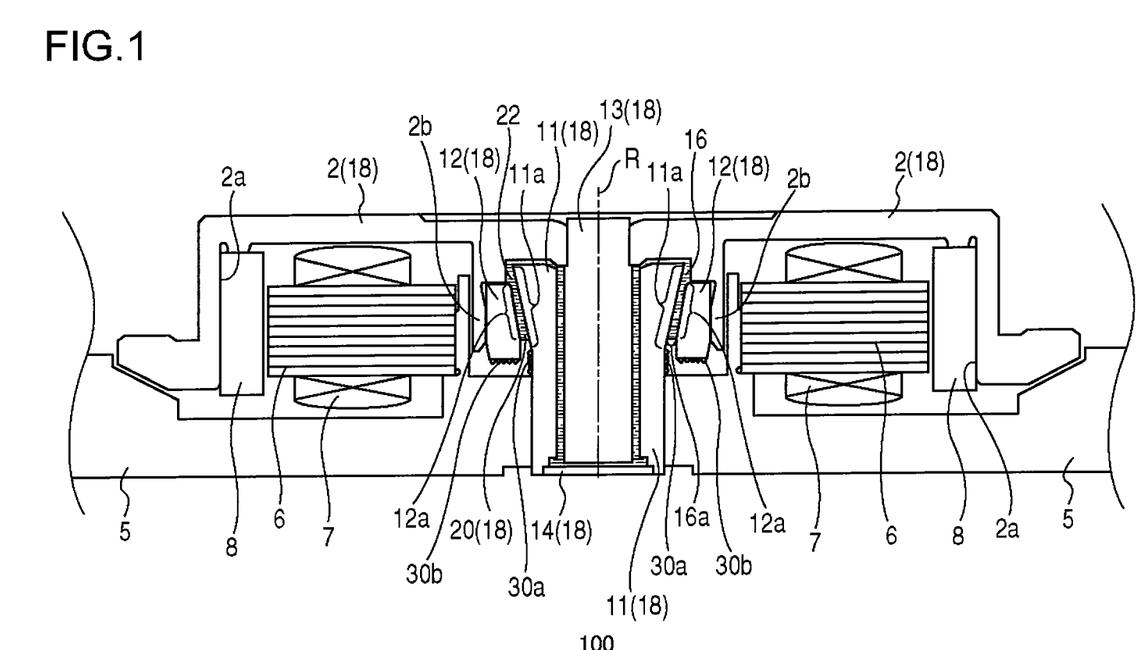
FIG. 1 is a vertical cross sectional view that shows a brushless motor manufactured by a method for manufacturing a fluid dynamic bearing according to the first or the second embodiment of the present invention.

A fluid dynamic bearing manufactured by the method according to the first or the second embodiment of the present invention is installed in a brushless motor. Preferably, such a brushless motor is used as a brushless motor that is installed in a hard disk drive and that drives a magnetic recording disk or a disk drive motor that is installed in an optical-disk drive device such as a CD device or a DVD device FIG. 1 is a vertical cross sectional view that shows a brushless motor 100 manufactured by a method for manufacturing a fluid dynamic bearing according to the first or the second embodiment of the present invention. The brushless motor 100 comprises a hub 2, a shaft 13, a ring-shaped magnet 8, a base plate 5, a laminated core 6, coils 7, a sleeve 11, a plate 14, lubricant 20, and a thrust ring 12. Hereinafter, it is assumed that the side of the base plate 5 on which the hub 2 is installed is the "upper" side.

The hub 2, the shaft 13, the thrust ring 12, and the ring-shaped magnet 8 form a rotor, and these components rotate as a unit around the rotational axis R of the motor when the brushless motor 100 rotates. One end of the shaft 13 is press-fitted in a hole located at the center of the hub 2. The hub 2 includes a hollow-cylindrical hanging portion 2b that hangs from the bottom surface of the hub 2. The thrust ring 12 is fixed to the inner surface of the hanging portion 2b.

The ring-shaped magnet 8 is glued on the inner surface 2a of the cup-shaped hub 2. The ring-shaped magnet 8 is made of a rare-earth material such as Neodymium, Iron, or Boron. The ring-shaped magnet 8 faces radially towards twelve teeth of the laminated core 6. The ring-shaped magnet 8 is tangentially magnetized for driving with eight poles.

The base plate 5, the laminated core 6, the coils 7, the sleeve 11, and the plate 14 form a stator. The stator rotatably supports the rotor when the brushless motor 100 rotates. The base plate 5 is a part of the base of the hard disk drive. The base plate 5 has a hole along the rotational axis R of the motor. The sleeve 11 is glued on the inner surface of the hole. The sleeve 11 accommodates the shaft 13. The plate 14 is glued on the bottom surface of the sleeve 11, and the plate 14 is sealed there.

The base plate 5 may be made separately from the base of the hard disk drive.

The laminated core 6 has a ring portion and twelve teeth that extend radially from the ring portion. The laminated core 6 is formed by laminating nine thin electromagnetic steel plates and integrating them by laser welding. Each of the coils 7 is wound around one of the twelve teeth, respectively. A driving flux is generated along the teeth by applying a three-phase sinusoidal driving current through the coils 7. The laminated core 6 is glued to the base plate 5.

The lubricant 20 is injected in a storage region 16 that is defined as a region in between part of the rotor (the shaft 13, the thrust ring 12, and the hub 2) and part of the stator (the sleeve 11 and the plate 14). The shaft 13, the thrust ring 12, the hub 2, the sleeve 11, the plate 14, and the lubricant 20 form a fluid dynamic bearing 18, which is a bearing that uses a dynamic pressure generated in the lubricant 20.

A pair of herringbone-shaped radial dynamic pressure grooves that are separated from each other are formed on the inner surface of the sleeve 11. A herringbone-shaped thrust dynamic pressure groove is formed on the upper-end surface of the sleeve 11. The rotor is axially and radially supported by the dynamic pressure generated in the lubricant 20 by these dynamic pressure grooves when the brushless motor 100 rotates. The lubricant 20 is supplied in both the radial dynamic pressure grooves and the thrust dynamic pressure groove by supplying the lubricant 20 in the storage region 16.

The outer surface 11a of the sleeve 11 close to its upper end is made to be a tilted surface so that the diameter of the tilted surface becomes larger as it gets close to the upper end. The tilted angle of this tilted surface with respect to the rotational axis R of the motor is defined as θ is. The inner surface 12a of the thrust ring 12 that faces the outer surface 11a of the sleeve 11 is made to be a tilted surface so that the diameter of the tilted surface becomes upwardly larger. The tilted angle of this tilted surface with respect to the rotational axis R of the motor is defined as θth. The brushless motor 100 is designed so that it satisfies 0<θth<θis.

Therefore, the entrance space 22 that is sandwiched in between the outer surface 11a of the sleeve 11 and the inner surface 12a of the thrust ring 12 downwardly expands. This may cause a capillary phenomena where the lubricant 20 is pulled into the upper portion of the entrance space 22, thereby the structure can prevent the lubricant 20 that has once been filled from leaking out.

The portion around the bottom-end where the slope of the inner surface 12a of the thrust ring 12 ends is defined as an entrance 16a of the entrance space 22. This entrance 16a also is the entrance 16a of the storage region 16 that includes the entrance space 22.

The amount of the lubricant 20 filled is set so that the liquid level sits in the middle of the entrance space 22 in order to compensate for the decrease in the lubricant 20 due to evaporation, etc.

The oil migration, where the lubricant 20, such as oil, spreads along the surface of the component, is known in the art. The first oil repellent region 30a and the second oil repellent region 30b are formed around the entrance 16a of the storage region 16 in order to prevent the lubricant 20 from leaking out due to this oil migration. The first oil repellent region 30a is formed by applying an oil repellent material, such as fluorocarbon polymers, to the surface around the bottom-end where the slope of the outer surface 11a of the sleeve 11 ends. The second oil repellent region 30b is formed by applying oil repellent material, such as fluorocarbon polymers, to the bottom surface of the thrust ring 12.

The leakage of the lubricant can be reduced because the first oil repellent region 30a and the second oil repellent region 30b repels the lubricant 20 even if the lubricant 20 spreads out of the storage region 16 due to the oil migration.

Figure 2A:
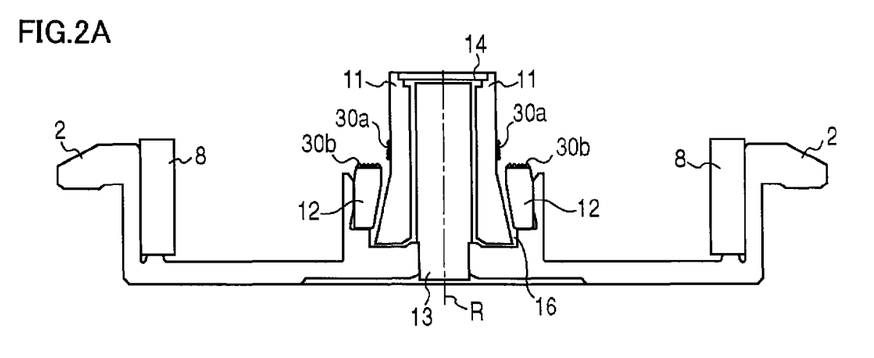
FIGS. 2A to 2C are process drawings that show a method for manufacturing a fluid dynamic bearing according to compared technique.
Figure 2B:
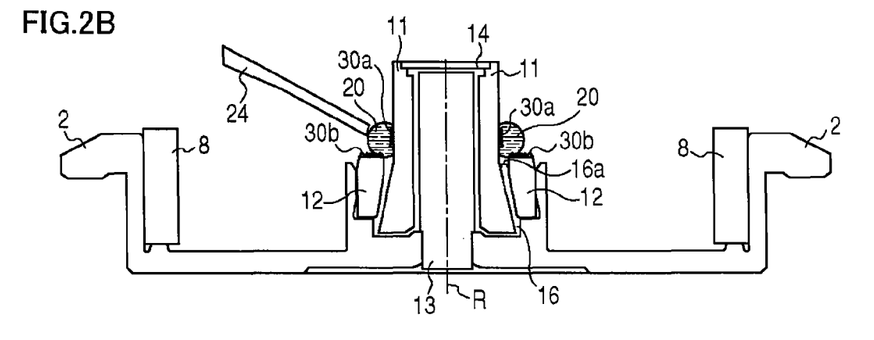
Figure 2C:
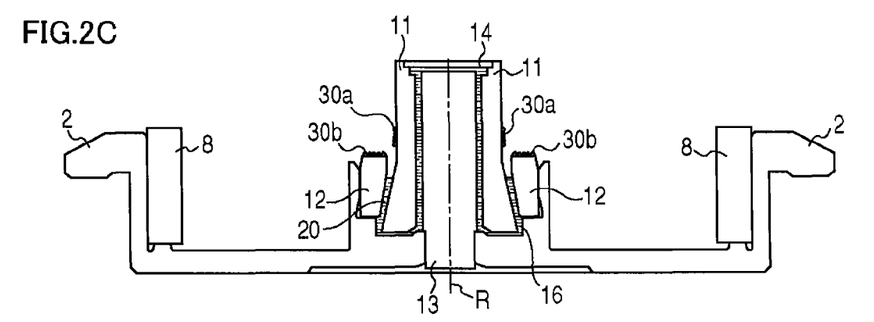

The method according to compared technique is explained. This method is for manufacturing the fluid dynamic bearing 18 included in the brushless motor 100 above. FIGS. 2A to 2C are process drawings that show a method for manufacturing the fluid dynamic bearing 18 according to compared technique.

FIG. 2A shows a preparing step for preparing for injection of the lubricant 20. In this preparing step, a fluid dynamic bearing that the lubricant 20 is not injected into is placed in the work space with the bottom surface facing upward. Then, the pressure in the work space is reduced, thereby the pressure of the storage region 16 is reduced.

FIG. 2B shows a dripping step for dripping the lubricant 20. In this dripping step, the nozzle 24 is moved close to the outside of the entrance 16a of the storage region 16, and a desired amount of the lubricant 20 is dripped there, and the dripped lubricant 20 adheres around the entrance 16a due to its surface tension. This desired amount is set to be the amount enough to fill the storage region 16.

FIG. 2C shows a pulling step for pulling the lubricant 20 into the inside of the storage region 16. In this pulling step, the lubricant 20 is pulled into the inside of the storage region 16 by the pressure difference between the inside and the outside of the storage region 16 introduced by restoring the pressure in the work space. This fills the lubricant 20 in the storage region 16.

In the method according to the compared technique above, as shown in FIG. 2B, it is inevitable for the lubricant 20 to adhere to the first oil repellent region 30a and the second oil repellent region 30b. Therefore, after the fluid dynamic bearing 18 has been manufactured, the lubricant 20 is removed from the first oil repellent region 30a and the second oil repellent region 30b by wiping, etc.

The inventors of the present invention found the following problem with regard to the compared technique: it is impossible to completely remove the lubricant 20 from the first oil repellent region 30a and the second oil repellent region 30b by methods such as wiping. The function to prevent the oil migration is deteriorated on the portion of the oil repellent regions where the lubricant 20 remains (hereinafter referred to as a path of oil.)

Considering the path of oil, it is understood that the path of oil appears due to the fact that the remaining lubricant 20 "matches" the surface of the oil repellent regions. In other words, in case oil droplets hit the surface, such as the oil repellent region, whose surface tension is made larger, the oil droplets maintain a droplet-shape and are repelled if the oil droplets contain a slight amount. However, once even a streak of oil is formed as a result of many oil droplets hitting the surface, a thin film of oil is formed there, and the surface tension there is weakened and the streak of oil is maintained. Oil joins the streak of oil due to the difference in the surface tension between the streak portion and its surroundings; thereby the streak of oil grows. It is understood that this effect makes the above-mentioned path of oil.

Once the path of oil has been formed on the first oil repellent region 30a or the second oil repellent region 30b, the lubricant 20 spreads out through the path. Since the lubricant 20 gathers, the path of oil grows toward its surroundings with increasing speed. Such a spread-out of the lubricant 20 may contaminate the surface of the recording disk and cause a problem. Moreover, if the lubricant 20 continues to leak out, in the end, the storage region 16 may run short of the lubricant 20. This may cause a burn-out of the fluid dynamic bearing 18 and an increase of the power required for driving the brushless motor 100.

The inventors of the present invention invented the method for manufacturing the fluid dynamic bearing according to the first and the second embodiment of the present invention in light of these problems of the compared technique. FIGS. 3A to 3D are process drawings that show the method for manufacturing the fluid dynamic bearing according to the first embodiment of the present invention.

Figure 3A:
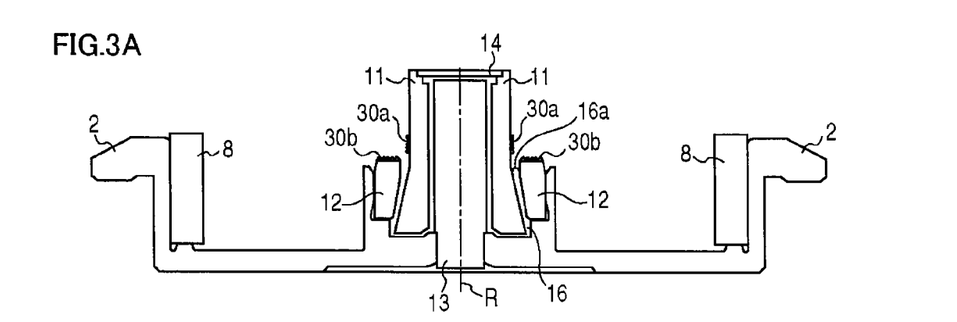
FIGS. 3A to 3D are process drawings that show a method for manufacturing a fluid dynamic bearing according to the first embodiment of the present invention.

FIG. 3A shows a preparing step for preparing for injection of the lubricant 20. In this preparing step, a fluid dynamic bearing that the lubricant 20 is not injected into is placed in a work space that can be evacuated, with the entrance 16a of the storage region 16 facing upward. Then, the pressure of the storage region 16 is reduced by lowering the working pressure that is the atmospheric pressure in the work space to below, for example, 100 Pa.

Figure 3B:
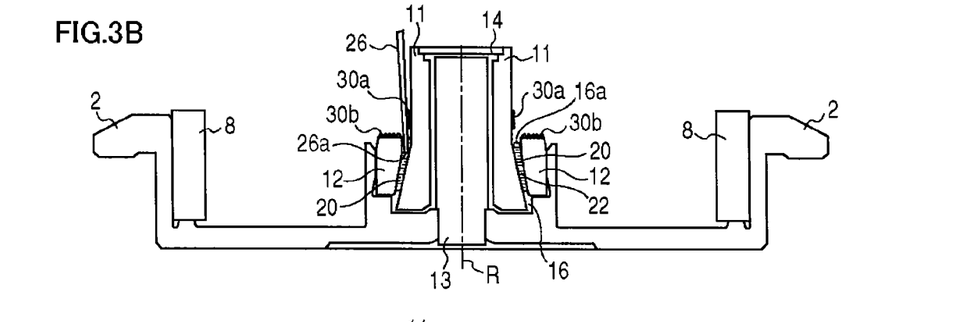

FIG. 3B shows an injection step for injecting the lubricant 20. In this injection step, first, a delivery nozzle 26 that delivers the lubricant 20 is inserted into the entrance space 22. This insertion happens so that the delivery nozzle 26 is moved to the horizontal position corresponding to the entrance 16a of the storage region 16, and then the delivery nozzle 26 is moved vertically towards inside the entrance space 22. This may guarantee that the delivery nozzle 26 is not an obstacle when the fluid dynamic bearing that the lubricant 20 is not injected into is placed in the work space, thereby the fluid dynamic bearing can be placed quickly and easily.

After the delivery nozzle 26 is inserted into the entrance space 22, the lubricant 20 is delivered from the delivery nozzle 26. The amount of the delivered lubricant 20 is set so that the lubricant 20 does not spill over from the storage region 16. For example, the amount of the delivered lubricant 20 is set to be an amount enough to fill the entrance space 22.

Figure 3C:
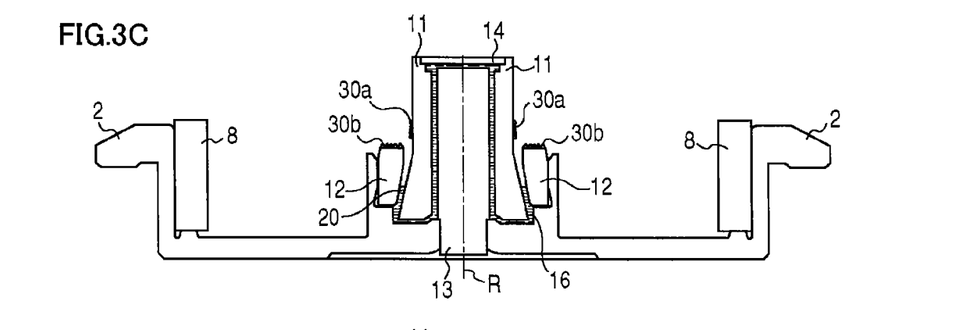

FIG. 3C shows a pulling step for pulling the lubricant 20 into the inside of the storage region 16. In this pulling step, the pressure of the work place is restored, such as to an ambient pressure that is higher than that in the storage region 16. The lubricant 20 is pulled into the inside of the storage region 16 by the pressure difference between inside and outside of the storage region 16. This fills the lubricant 20 in the storage region 16.

Preferably, the lubricant temperature, that is a temperature of the lubricant 20 that is delivered or filled, is set to be higher than or equal to 40 degrees Celsius and lower than or equal to 120 degrees Celsius. In case the lubricant temperature is higher than or equal to 40 degrees Celsius, the viscosity decreases enough to be able to deliver or fill the lubricant quickly and smoothly. In case the lubricant temperature is kept lower than or equal to 120 degrees Celsius, it is advantageous in light of the amount of evaporation.

If the ratio of the volume of the entrance space 22 with respect to the volume of the storage region 16 is higher than 50 percent, after the pulling step shown in FIG. 3C, the liquid level of the lubricant 20 appears in the middle of the entrance space 22. Therefore, if the ratio of the volume of the entrance space 22 with respect to the volume of the storage region 16 is higher than or equal to 60 percent, after the pulling step the fluid dynamic bearing 18 has a proper amount of the lubricant 20 even if an unevenness in manufacturing the fluid dynamic bearing 18 or an appropriate margin is taken into consideration. However, if the ratio is lower than 50 percent or if a larger margin is desired, it is necessary to further have the step of adding the lubricant 20.

Figure 3D:
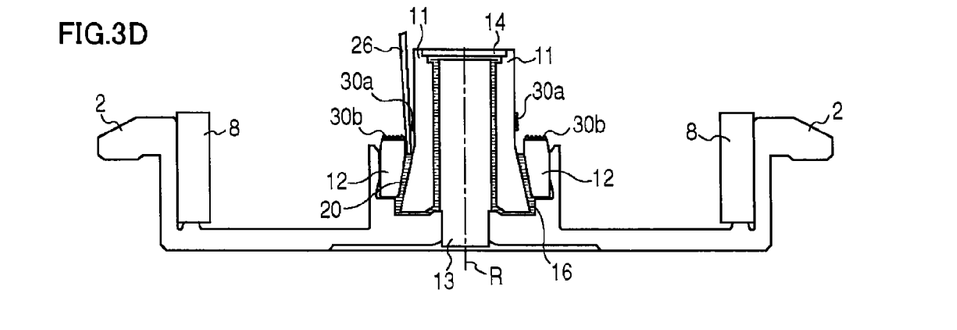

FIG. 3D shows an adding step for adding the lubricant 20 so that the lubricant 20 reaches the desired amount. In this adding step, at an ambient pressure, the tip of the delivery nozzle 26 is again inserted into the storage region 16, in particular beyond the liquid surface of the lubricant 20 already filled. Then the lubricant 20 is additionally delivered from the delivery nozzle 26 so that the desired amount is reached.

Figure 4:
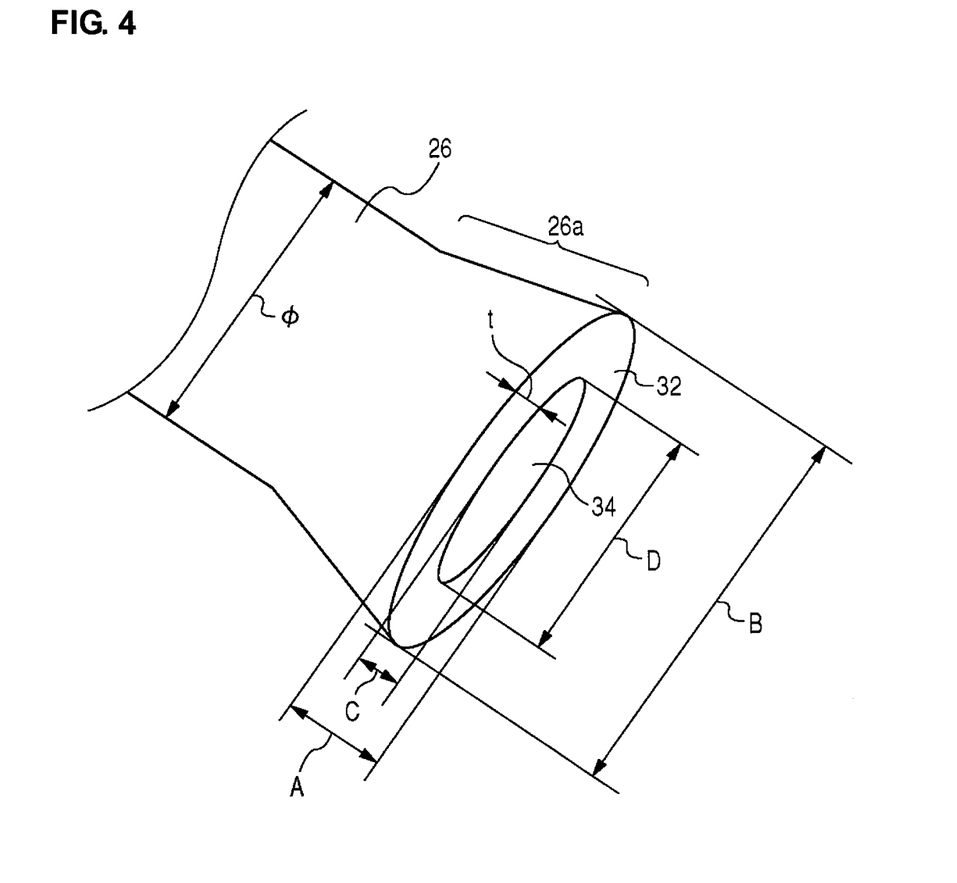
FIG. 4 is an enlarged view that enlarges the tip portion of the delivery nozzle on the delivery side.

The delivery nozzle 26 is explained here. FIG. 4 is an enlarged view that enlarges the tip portion of the delivery nozzle 26 on the delivery side. For example, the delivery nozzle 26 is made of stainless steel pipe such as SUS316 with a 0.35 mm outside diameter and with a 0.05 mm wall thickness t. In the process of inserting the delivery nozzle 26 in the entrance space 22 in the injecting step shown in FIG. 3B, the delivery nozzle 26 is inserted along the angular direction that forms a predetermined insertion angle, such as from 0 to 45 degrees, with respect to the vertical direction so that no part of the delivery nozzle 26 touches the sleeve 11. In this case, the depth to which the delivery nozzle 26 is inserted into the entrance space 22 can be increased, thereby reducing the possibility that the lubricant 20 leaks out when it is injected.

The shape of the tip portion of the delivery nozzle 26 on the delivery side is explained. In order for the delivery nozzle 26 to be inserted into the entrance 16a of the storage region 16, the size of the one end of the delivery nozzle 26 that delivers the lubricant 20 (hereinafter referred to as a delivery end 26a) should be less than or equal to 90 percent of the interval of the entrance 16a. However, if the size of the delivery end 26a is made small, the delivery hole on the delivery end 26a also becomes small. This may increase the time to deliver the desired amount of the lubricant 20 and may reduce productivity.

Therefore, regarding the delivery nozzle 26 according to the first embodiment of the present invention, the cross section 32 of the delivery end 26a has a flat shape, such as an ellipse-shape. This is realized by pressing the delivery end 26a with an appropriate force. In this case, the flat shape gives a large cross section even if the interval of the entrance 16a is narrow. This allows the desired amount of the lubricant 20 to be delivered quickly, thereby contributing to the increase of productivity.

The insertion of the delivery nozzle 26 in the entrance 16a is performed by aligning the major axis of the delivery end 26a with the tangential direction of the ring-shaped entrance 16a. It has been found that the entrance 16a of the storage region 16 is preferably set to be about, for example, 0.1 mm to 0.4 mm because the amount of the lubricant 20 spread out increases if it is too wide according to the inventors' experience in the art. Therefore, the shorter width A of the flat-shape of the delivery nozzle 26 is set to be 90 percent of the interval of the entrance 16a, that is, 0.09 mm to 0.36 mm.

It is advantageous to set the longer width B of the flat-shape to be 1.5 to 5 times the width of the shorter width A in light of the durability of the delivery nozzle 26.

Preferably, regarding the flat delivery hole 34 made on the delivery end 26a, the shorter width C of the delivery hole 34 is set to be one-third to two-thirds that of the shorter width A of the delivery end 26a. In terms of the interval of the entrance 16a of the storage region 16, it is preferable to set the shorter width C of the delivery hole 34 to less than or equal to 60 percent of the interval of the entrance 16a. In the case where the shorter width C of the delivery hole 34 is greater than or equal to one-third that of the shorter width A of the delivery end 26a, it will not take a long time to deliver the lubricant 20. In the case where the shorter width C of the delivery hole 34 is lower than or equal to two-thirds that of the shorter width A of the delivery end 26a, it is possible to have enough wall thickness t of the wall around the delivery hole 34 (the wall thickness of the tube). This enough wall thickness may contribute to the obtainment of a desired strength and to the prevention of deformation.

In the first embodiment of the present invention, the interval of the entrance 16a of the storage region 16, the shorter width A of the flat delivery end 26a, the longer width B, the shorter width C of the delivery hole 34, and the longer width D are 0.25 mm, 0.2 mm, 0.4 mm, 0.1 mm, and 0.3 mm, respectively. The delivery nozzle 26 is inserted into the entrance region 22 along an angular direction that forms 20 degrees with respect to the vertical direction.

In the method for manufacturing the fluid dynamic bearing according to the first embodiment of the present invention, the lubricant 20 is delivered after the delivery nozzle 26 is inserted into the storage region 16. Therefore, it is less likely for the lubricant 20 to adhere to the outside of the entrance 16a of the storage region 16. As a result, it is less likely for the lubricant 20 to adhere to the first oil repellent region 30a and the second oil repellent region 30b, thereby suppressing the spread-out of the lubricant 20 through the path of oil.

The method for manufacturing the fluid dynamic bearing according to the first embodiment of the present invention allows the desired amount of the lubricant 20 to be filled by adding the lubricant 20 even if the ratio of the volume of the entrance space 22 with respect to the volume of the storage region 16 is low, i.e., the entrance space 22 is small. Therefore, this method for manufacturing is preferably applicable to a wider variety of fluid dynamic bearings.

In addition, the adding step for adding the lubricant 20 is performed at an ambient pressure, thereby easing the operation. Furthermore, since the tip of the delivery nozzle 26 is inserted beyond the liquid surface of the already-filled lubricant 20, it is less likely to catch air while adding the lubricant 20.

The first embodiment of the present invention describes the case where the work pressure is reduced to below 100 Pa in the preparing step. However, the present invention is not limited to this. For example, the case where the work pressure is reduced to below 10 Pa is preferable in that air is less likely to be caught by the lubricant. The case where the work pressure is reduced to below 5 Pa is preferable in that air is less likely to be dissolved in the lubricant.

The first embodiment of the present invention describes the case where the lubricant 20 is added at an ambient pressure in the adding step. However, the present invention is not limited to this. For example, the lubricant may be delivered again at a reduced pressure. This case is preferable in that it is less likely to catch air in the lubricant.

The first embodiment of the present invention describes the case where the same delivery nozzle 26 as the one used in the injection step is used when adding the lubricant 20 in the adding step. However, the present invention is not limited to this. For example, since adding the lubricant 20 does not require a reduced-pressure environment, it is an option that the lubricant is added using a nozzle different from the delivery nozzle 26 after moving the fluid dynamic bearing 18 to a place different from the work space, the pressure of which possible to be reduced. In this case, it is not necessary to use a pressure-reducing apparatus that could be of a large-scale in the adding step. This may improve the availability of the pressure-reducing apparatus. Furthermore, an appropriate lubricant delivery apparatus could be used in the injection step and the adding step, respectively. For example, a delivery apparatus that permits a large flow rate of the lubricant may be used in the injection step. An apparatus that precisely controls the amount of the lubricant delivered may be used in the adding step. These may increase the productivity and the quality of the products.

In the first embodiment of the present invention, the delivery end 26a of the delivery nozzle 26 may be made of a material, such as fluorocarbon polymers, that is softer than the material that the fluid dynamic bearing 18 is made of. In this case, even if the delivery end 26a hits a component of the fluid dynamic bearing 18, it is less likely to scratch the wall of the component. Moreover, since the operator does not have to care whether the delivery end 26a hits the fluid dynamic bearing 18, the size of the delivery end 26a could be made larger, thereby supplying more lubricant quickly. The similar advantage is provided if an outer surface of the delivery end 26a is coated with, for example, a resin.

The method for manufacturing according to the second embodiment of the present invention is described. FIGS. 5A-5D are process drawings that show the method for manufacturing the fluid dynamic bearing according to the second embodiment of the present invention.

Figure 5A:
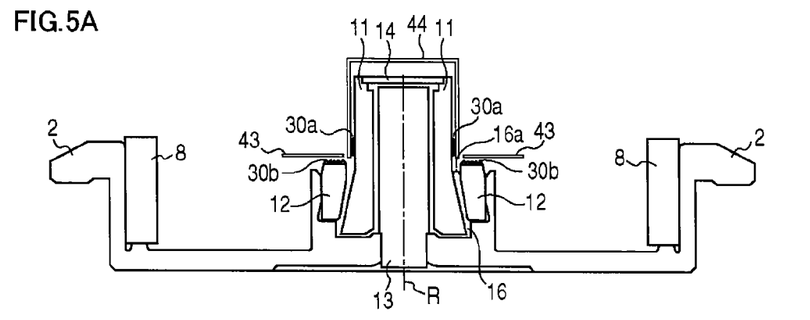
FIGS. 5A-5D are process drawings that show a method for manufacturing a fluid dynamic bearing according to the second embodiment of the present invention.

FIG. 5A shows a preparing step for preparing the injection of the lubricant 20. In this preparing step, a fluid dynamic bearing that the lubricant 20 is not injected into is placed in the work space that can be evacuated, with the entrance 16a of the storage region 16 facing upward. Then, the first oil repellent region 30a is covered by installing a cup-shaped first mask jig 44 from the plate 14 side of the sleeve 11. A ring-shaped second mask jig 43 is set on the bottom surface of the thrust ring 12 so that it coves the second oil repellent region 30b. After setting the first mask jig 44 and the second mask jig 43, the pressure of the storage region 16 is reduced by lowering the working pressure in the work space to below, for example, 100 Pa.

Figure 5B:
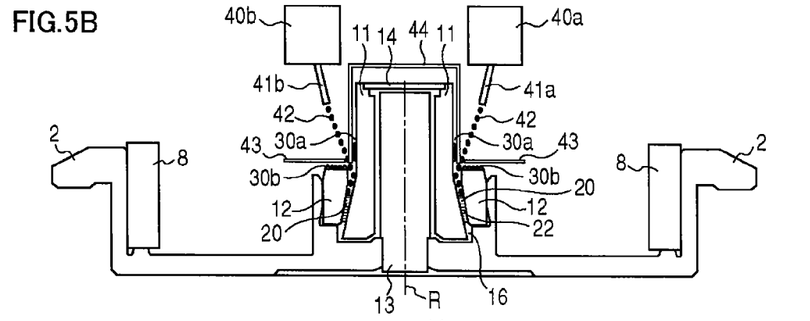

FIG. 5B shows an ejecting-introducing step for ejecting and introducing the lubricant 20. In this ejecting-introducing step, two lubricant tanks 40a, 40b that store the lubricant 20, two ejection nozzles 41a, 41b that eject the lubricant 20 stored in the lubricant tanks 40a, 40b, respectively, and a temperature control unit (not shown in the figures) that controls the temperatures of the ejected lubricant 20 or the work space of the manufacturing apparatus within ±10 degrees Celsius with respect to a desired temperature are arranged.

The two ejection nozzles 41a, 41b are arranged so that they face to each other and they surround the entrance 16a of the storage region 16. The two ejection nozzles 41a, 41b are located apart from the storage region 16. Each of the ejection nozzles 41a, 41b is aimed so that droplets 42 of the lubricant 20 ejected from the two ejection nozzles 41a, 41b enter the entrance 16a of the storage region 16.

Each of the two lubricant tanks 40a, 40b comprises a pressure control means, such as a piezoelectric element, for controlling the pressure of the lubricant 20 inside. It is possible to instantaneously increase the liquid pressure of the lubricant 20 inside the lubricant tank by applying a voltage pulse to this pressure control means. This instantaneous increase of the liquid pressure pushes the lubricant 20 out of the ejection nozzle 41. The pushed-out lubricant 20 flies towards the entrance space 22 as fine droplets 42. The amount of the lubricant 20 ejected from the two ejection nozzles 41a, 41b is set so that the lubricant 20 does not spill over from the entrance space 22.

Figure 5C:
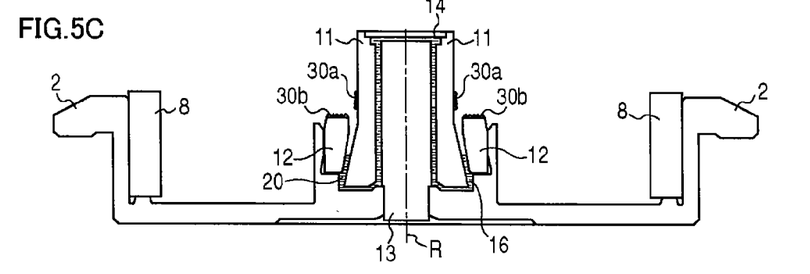

FIG. 5C shows a pulling step for pulling the lubricant 20 into the inside of the storage region 16. In this pulling step, the pressure of the work place is restored to a pressure, such as an ambient pressure, higher than that in the storage region 16. The lubricant 20 is pulled into the inside of the storage region 16 by the pressure difference between inside and outside of the storage region 16. This fills the lubricant 20 in the storage region 16. The first mask jig 44 and the second mask jig 43 are removed thereafter.

As described in the first embodiment of the present invention, it may be necessary to further add the lubricant 20 after the pulling step depending on the situation.

Figure 5D:
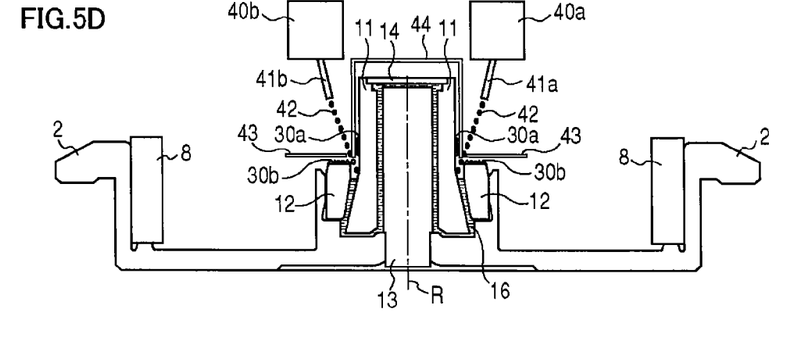

FIG. 5D shows an adding step for adding the lubricant 20 so that the amount of the lubricant 20 reaches the desired amount. The detailed description of the adding step is omitted here since the steps similar to the preparing step and the ejecting-introducing step above are repeated in the adding step. The adding step fills the lubricant 20 in the storage region 16 so that the amount of the lubricant 20 reaches the desired amount. As described in the first embodiment of the present invention, the adding step may be performed in either the reduced pressure environment or the standard pressure environment.

In the method for manufacturing the fluid dynamic bearing according to the second embodiment of the present invention, the first oil repellent region 30a and the second oil repellent region 30b are covered by the mask jigs while injecting the lubricant 20. Therefore, these mask jigs can prevent the lubricant 20 from adhering to the first oil repellent region 30a and the second oil repellent region 30b.

It is not necessary to insert the two ejection nozzles 41a, 41b in the entrance space 22 in the method for manufacturing the fluid dynamic bearing according to the second embodiment of the present invention. Therefore, it is less likely to scratch the wall surface of the fluid dynamic bearing. Since the lubricant 20 is injected in the form of fine droplets 42, the lubricant 20 is nicely injected even if the entrance 16a of the storage region 16 is narrow. In the case where the amount of the lubricant 20 injected is assumed to be proportional to the period of injection or the number of voltage pulses, it is possible to adjust the amount of the lubricant 20 injected more precisely by controlling those parameters.

It is possible to use the two ejection nozzles 41a, 41b simultaneously in order to inject the lubricant 20 in the method for manufacturing the fluid dynamic bearing according to the second embodiment of the present invention. Therefore, it is possible to shorten the working hours by the corresponding amount.

The temperature of the ejected lubricant 20 is controlled within ±10 degrees Celsius with respect to the desired temperature by the temperature control unit. Therefore, the tracks of the flying droplets 42 are stabilized even if the track appears differently depending on the temperature. This contributes to the efficient injection of the lubricant 20. A temperature control unit that can control the temperature of the lubricant 20 within ±5 degrees Celsius with respect to the desired temperature is preferred in terms of the stabilization of the tracks of the flying droplets 42.

The second embodiment of the present invention describes the case where the two ejection nozzles 41a, 41b are used. However, the present invention is not limited to this. Any number of ejection nozzles could be used as long as the space allows.

The second embodiment of the present invention describes the case where the lubricant 20 is ejected by applying a voltage pulse to the pressure control means such as piezoelectric elements. However, the present invention is not limited to this. For example, it is an option to arrange a heater in the lubricant tank and activate the heater. Bubbles are generated in the lubricant by heating the lubricant with the heater, and the lubricant is ejected due to the pressure caused by the bubbles. In this case, conveniently, the heater for controlling the temperature of the lubricant is also used as the heater for ejecting the lubricant.

If the excess amount of the lubricant 20 exists in the entrance space 22 of the fluid dynamic bearing 18, it is more likely for the lubricant 20 to leak out due to unintentional vibrations, etc. Therefore, the method for manufacturing the fluid dynamic bearing according to the first embodiment or the second embodiment of the present invention may include a sucking-out step. In this sucking-out step, after the lubricant 20 is filled, a nozzle for sucking out the lubricant 20 is inserted into the lubricant 20, and the lubricant 20 is sucked out so that the amount of the lubricant 20 reaches a desired amount. In this sucking-out step, at an ambient pressure, the lubricant 20 is sucked out while the amount of the lubricant 20 is being measured by a measuring means, such as by a laser sensor. In this case, the possibility of the lubricant 20 leaking out is lowered by sucking out the excess lubricant 20. Also, it is possible to lower the cost by re-using the sucked-out lubricant 20.

In the first and the second embodiments of the present invention above, the fluid dynamic bearing 18 may be heated while being manufactured. Heating the fluid dynamic bearing 18 causes the sleeve 11 or the thrust ring 12 to be expanded with heat, thereby the volume of the storage region 16 or the entrance space 22 is expanded for a while. As a result, the efficiency of the work increases as the lubricant 20 is introduced into the inside of the storage region 16 smoothly.

Preferably, the temperature to which the fluid dynamic bearing 18 is heated is set to be higher than or equal to 40 degrees Celsius and lower than or equal to 120 degrees Celsius. If the temperature is higher than or equal to 40 degrees Celsius, the volume of the storage region 16 or the entrance space 22 is expanded sufficiently so that the filling of the lubricant above is performed smoothly and quickly. It is advantageous to keep the temperature of the lubricant 20 lower than or equal to 120 degrees Celsius in light of the amount of evaporation.

While the preferred embodiments of the present invention have been described using specific terms, such description is for illustrative purposes only, and it is to be understood that changes and variations may be made without departing from the spirit or scope of the appended claims.

In the first embodiment of the present invention, a temperature control unit (not shown in the figures) that controls the lubricant temperature of the delivered and filled lubricant 20 within ±10 degrees Celsius with respect to a desired temperature may be arranged. In this case, the lubricant 20 is injected efficiently.

Figure 6:
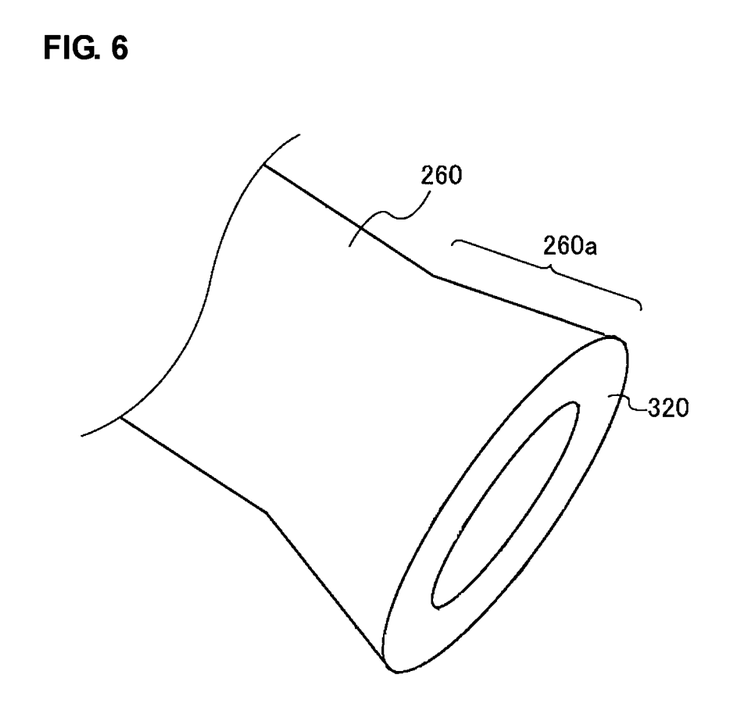
FIG. 6 is an enlarged view that enlarges the tip portion of the sucking nozzle according to the variation on the sucking side.

In the case where the method for manufacturing according to the first or the second embodiment of the present invention further includes the sucking-out step where, after the lubricant 20 is filled, a nozzle for sucking out the lubricant 20 is inserted into the lubricant 20, and the lubricant 20 is sucked out so that the amount of the lubricant 20 reaches a desired amount, the nozzle 260 for sucking out may have one end 260a that vacuums up the lubricant 20, the cross section 320 of which has a flat shape, such as an ellipse-shape. This is realized by pressing the vacuuming end 260a with an appropriate force. FIG. 6 is an enlarged view that enlarges the tip portion of the sucking nozzle 260 on the vacuuming side according to the variation on the sucking side.

In this case, the flat shape gives a large cross section even if the interval of the entrance 16a is narrow. This allows the desired amount of the lubricant 20 to be sucked out quickly, thereby contributing the increase of the productivity.

The vacuuming end 260a of the sucking nozzle 260 may be made of a material, such as fluorocarbon polymers, that is softer than the material that the fluid dynamic bearing 18 is made of. In this case, even if the vacuuming end 260a hits a component of the fluid dynamic bearing 18, it is less likely to scratch the wall of the component. Moreover, since the operator does not have to care whether the vacuuming end 260a hits the fluid dynamic bearing 18, the size of the vacuuming end 260a could be made larger, thereby sucking out more lubricant quickly. The similar advantage is provided if an outer surface of the vacuuming end 260a is coated with, for example, a resin.

What is claimed is:

1. A method for manufacturing a fluid dynamic bearing, the fluid dynamic bearing comprising:
   a storage region formed between a stator and a rotor; and a lubricant injected into the storage region, wherein the storage region has an entrance space as a gap where the rotor faces the stator, a middle of the entrance space including an interface where the lubricant sits when the rotor rotates with respect to the stator, and
   wherein the fluid dynamic bearing rotatably supports the rotor with respect to the stator by a dynamic pressure generated in the lubricant,
   the method including the steps of:
   preparing the fluid dynamic bearing that lubricant is not injected into in a predetermined work space;
   reducing the pressure in the work space;
   moving a nozzle that delivers the lubricant towards an inside of the entrance space so that a tip of the nozzle is inserted into the entrance space;
   delivering the lubricant in the storage region in an amount such that the lubricant does not spill over from the storage region and that immerses the tip of the nozzle; and
   restoring pressure in the work space.

2. The method according to claim 1, wherein the fluid dynamic bearing is heated in the step of delivering, and
   wherein the storage region's volume is temporarily expanded by heating.

3. The method according to claim 1, further including:
   delivering additional lubricant, by inserting the nozzle that delivers the lubricant, into the entrance space after the step of restoring the pressure, wherein the additional lubricant is delivered to the storage region through the tip of the nozzle being inserted within lubricant already filled in the storage region.

4. The method according to claim 1, wherein the width of the entrance of the storage region is greater than or equal to 0.1 mm and less than or equal to 0.4 mm, and the tip of the nozzle has an ellipse-like cross-section, and the width of the tip along the minor axis is less than or equal to 90 percent of the width of the entrance of the storage region,
   wherein the entrance of the storage region is located at the end of the entrance space at a portion thereof with the largest width.

5. The method according to claim 1, wherein the temperature of the lubricant is set to be higher than or equal to 40 degrees Celsius and lower than or equal to 120 degrees Celsius.

6. The method according to claim 1, wherein the temperature of the lubricant is controlled within ±10 degrees Celsius with respect to a desired temperature.

7. The method according to claim 1, wherein, regarding the nozzle that delivers the lubricant, the cross section of one end that delivers the lubricant has an ellipse-like cross-section.

8. The method according to claim 1, wherein, regarding the nozzle that delivers the lubricant, one end that delivers the lubricant is made of a material that is softer than the material that the fluid dynamic bearing is made of.

9. The method according to claim 1, wherein, regarding the nozzle that delivers the lubricant, an outer surface of one end that delivers the lubricant is coated with a resin.

10. The method according to claim 1, wherein the rotor radially faces the stator at the gap of the entrance space.

11. A method for manufacturing a fluid dynamic bearing, the fluid dynamic bearing comprising:
    a storage region formed between a stator and a rotor; and
    a lubricant injected into the storage region,
    wherein the fluid dynamic bearing rotatably supports the rotor with respect to the stator by a dynamic pressure generated in the lubricant,
    the method including the steps of:
    forming an oil repellent region by applying an oil repellent material to a surface located around an entrance of the storage region, the oil repellent region arranged to prevent the lubricant from leaking out;
    preparing the fluid dynamic bearing that lubricant is not injected into in a predetermined work space;
    setting a mask jig on the fluid dynamic bearing so as to cover the oil repellant region;
    reducing pressure in the work space;
    aiming a plurality of nozzles that are located outside a vicinity of the storage region so that ejected droplets of lubricant enter the entrance of the storage region, the plurality of nozzles not attached to the mask jig;

ejecting, while the oil repellent region is simultaneously covered, the droplets of the lubricant from the plurality of nozzles so that the lubricant does not spill over from the storage region; and restoring pressure in the work space.

12. The method according to claim 11, wherein the fluid dynamic bearing is heated in the step of ejecting, and wherein the storage region's volume is temporarily expanded by heating.

13. The method according to claim 11, further including additionally ejecting droplets of the lubricant so that the droplets enter the entrance of the storage region after the step of restoring the pressure.

14. The method according to claim 11, wherein the temperature of the lubricant is set to be higher than or equal to 40 degrees Celsius and lower than or equal to 120 degrees Celsius.

15. The method according to claim 11, wherein the temperature of the lubricant is controlled within ±10 degrees Celsius with respect to a desired temperature.

16. A method for manufacturing a fluid dynamic bearing, the fluid dynamic bearing comprising:

a storage region formed between a stator and a rotor; and a lubricant injected into the storage region, wherein the fluid dynamic bearing rotatably supports the rotor with respect to the stator by a dynamic pressure generated in the lubricant, the method including the steps of:

forming an oil repellent region by applying an oil repellent material to a surface located around an entrance of the storage region, the oil repellent region arranged to prevent the lubricant from leaking out;

preparing the fluid dynamic bearing that lubricant is not injected into in a predetermined work space;

setting a mask jig on the fluid dynamic bearing so as to cover the oil repellant region;

reducing pressure in the work space;

injecting from a nozzle, while the oil repellent region is simultaneously covered by the mask jig, the lubricant into the storage region so that the lubricant enters in the entrance of the storage region, the nozzle not being attached to the mask jig; and restoring pressure in the work space.

17. The method according to claim 16, wherein the step of injecting includes a step of injecting the lubricant so that the lubricant does not spill over from the storage region.

18. The method according to claim 16, wherein the fluid dynamic bearing is heated in the step of injecting.

19. The method according to claim 16, further including additionally injecting the lubricant so that the lubricant enters the entrance of the storage region after the step of restoring the pressure.

20. The method according to claim 16, further including removing the lubricant so that the amount of the lubricant reaches a predetermined amount by inserting a nozzle into the lubricant for sucking out the lubricant.

* * * * *